May 23, 1939.  A. E. BENNETT  2,159,684
BEARING FOR WEIGHING SCALES
Filed Sept. 25, 1936
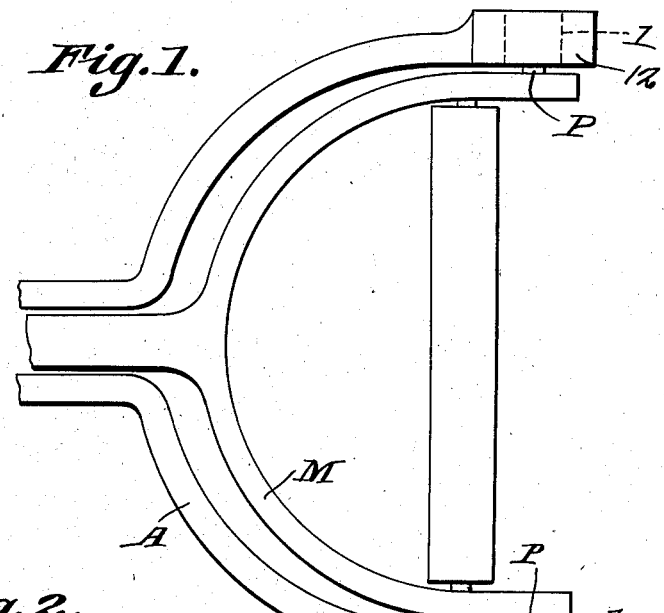
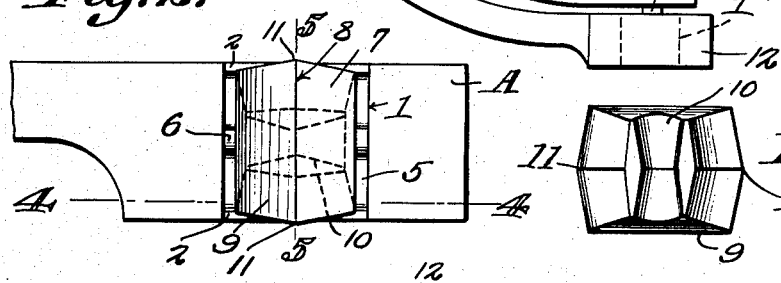
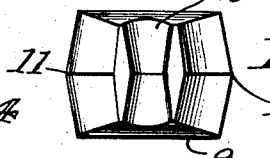
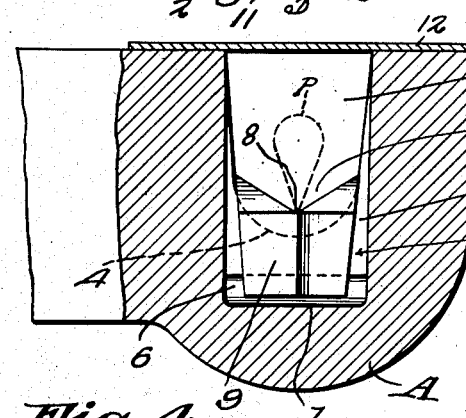
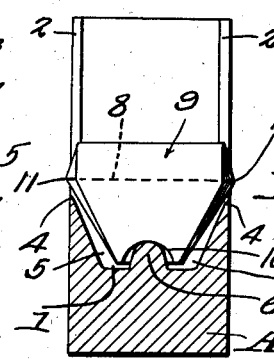
Inventor
A. E. Bennett
By C. A. Snow & Co.
Attorneys Patented May 23, 1939

2,159,684

UNITED STATES PATENT OFFICE 2,159,684

BEARING FOR WEIGHING SCALES

Albert E. Bennett, Jacksonville, Fla.

Application September 25, 1936, Serial No. 102,604

1 Claim. (Cl. 308—2)

This invention relates to a self alining bearing designed primarily for use in connection with weighing scales.

It is essential that the bearings of all scales be maintained accurately in position in order to insure accuracy of the weighing operation. It sometimes becomes necessary to make changes in the bearings after the scales have been set up and heretofore this operation has required the services of a skilled mechanic.

It is an object of the present invention to provide a bearing which can be placed in position by any one and is so constructed and mounted as to insure proper alinement and accuracy of operation. Thus the costly operation of re-setting or re-adjusting the bearings is obviated.

Furthermore it is possible to make the bearings out of hardened metal and use them in beams and other scale structures formed of relatively soft metal.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred form of the invention has been shown.

In said drawing:

Figure 1 is a plan view of a portion of a scales structure showing the location of some of the bearings.

Figure 2 is a top plan view of one of the self alining bearings, the portion of the beam in which it is seated being shown in plan.

Figure 3 is a bottom plan view of said bearing.

Figure 4 is a section on line 4—4 of Figure 2, the bearing being shown in end elevation.

Figure 5 is a section on line 5—5, Figure 2, the bearing being shown in side elevation.

Referring to the figures by characters of reference A, in the present instance constitutes the forked end of a scale beam and the ends of the fork are formed with recesses 1 extending downwardly thereinto, each recess being partly closed at its end by a wall 2 cut away to provide an opening 3 the side walls of which converge downwardly to a rounded bottom wall 4. Thus a pocket 5 is formed between the walls 2 within the lower portion of the recess 1 and on the bottom of this pocket there is formed a rib 6 extending parallel with said walls and having a rounded top and downwardly diverging sides as shown particularly in Figure 5.

The bearing member per se is formed of hardened metal and consists of a single block in the top of which is provided a V-shaped recess 7 the walls of which converge to a line indicated at 8. This block, designated at 9, has its walls converging downwardly and formed in the bottom of the block is a groove 10 of uniform depth the sides of which diverge from the center of the groove toward the end as shown in Figure 3. Thus it will be seen that when the block is in position within the pocket 5 the rib 6 will contact throughout its length with the wall of the groove 10 along the longitudinal center but the sides of the groove will be spaced from the rib so that the block is thus free to swing laterally about an upwardly extending axis while at the same time it is free to rock upon the rib 6. Consequently, where two blocks are used in opposite portions of a fork, they will aline automatically when knife edged pins P or the like extending from a relatively movable member M are placed in position within the recesses 7 and upon the central bearing portions 8 of the recesses.

The sides and ends of the block 9 are so shaped as to provide a desired clearance between the block and the walls of the recess 1 and, if desired, opposed faces of the block can be so beveled as to produce projecting noses 11 either of which can constitute a side thrust bearing for the member M so as to maintain said member out of contact with the fork A Any suitable cover plate 12 can be mounted over each bearing so as to partly or entirely close the recess 1 and prevent accumulations of foreign substances within the pocket 5.

Obviously the bearing blocks herein described will be made to proper size and shape at the factory and as the bearings become worn from use they can be replaced readily simply by lifting the blocks out of the pockets and substituting new blocks supplied by the factory. No special fitting or dressing of the blocks is required at the time of installation because the parts can be accurately made to insure correct fitting. Furthermore as each bearing block is free not only to rock but also to swing upon its supporting rib 6, the blocks, when used in pairs at opposite sides of a supported member, will be self aligning.

What is claimed is:

In a bearing for weighing scales the combination with a beam having a recess open at the top and sides and a pocket in the bottom of the recess having downwardly converging side walls and a bearing rib extending from one side to the other of the pocket and having a rounded top, of a block removably seated in the recess and having opposed portions extending beyond the open sides of the recess, each side of the block having outwardly converging faces inclined upwardly and inwardly and outwardly converging faces inclined downwardly and inwardly, all of said faces converging to a point or nose at each side of the block constituting a side thrust bearing, there being a groove of uniform depth within the bottom of the block and providing an elongated seat for the rib in the pocket, said groove gradually increasing in width from its center to each end and the width thereof at the center being substantially equal to the width of the engaged rib, and a movable member positioned to transmit thrust to one of the noses and a knife edge extending from said member engaging the top surface of the block, said surface having a longitudinal angular groove connecting the noses.

ALBERT E. BENNETT.